(12) United States Patent
Conway et al.

(10) Patent No.: US 11,473,003 B2
(45) Date of Patent: Oct. 18, 2022

(54) IRON CONTROL AS PART OF A WELL TREATMENT USING TIME-RELEASED AGENTS

(71) Applicant: Flex-Chem Holding Company, LLC, Weatherford, OK (US)

(72) Inventors: Andrew Bryce Conway, Weatherford, OK (US); Scott Bailey, Round Rock, TX (US)

(73) Assignee: Flex-Chem Holding Company, LLC, Weatherford, OK (US)

( * ) Notice: Subject to any disclaimer, the term of this patent is extended or adjusted under 35 U.S.C. 154(b) by 0 days.

(21) Appl. No.: 17/170,290

(22) Filed: Feb. 8, 2021

(65) Prior Publication Data

US 2021/0246358 A1 Aug. 12, 2021

Related U.S. Application Data

(60) Provisional application No. 62/971,451, filed on Feb. 7, 2020.

(51) Int. Cl.
*C09K 8/528* (2006.01)
*E21B 43/26* (2006.01)
*E21B 43/22* (2006.01)

(52) U.S. Cl.
CPC .............. *C09K 8/528* (2013.01); *E21B 43/26* (2013.01)

(58) Field of Classification Search
CPC .......... E21B 43/26; E21B 37/06; E21B 41/02; E21B 43/267; E21B 33/13; E21B 43/16; E21B 33/138
See application file for complete search history.

(56) References Cited

U.S. PATENT DOCUMENTS

| 3,960,736 A | 6/1976 | Free et al. |
| 3,983,254 A | 9/1976 | Alterman |
| 4,089,787 A | 5/1978 | Lybarger et al. |

(Continued)

FOREIGN PATENT DOCUMENTS

| CA | 2984014 A1 * | 5/2018 | ............... C09D 7/65 |
| CN | 101239757 A | 1/2008 | |

(Continued)

OTHER PUBLICATIONS

International Search Report dated May 14, 2021 in PCT/US2021/017080.

(Continued)

*Primary Examiner* — Zakiya W Bates
(74) *Attorney, Agent, or Firm* — Melissa M. Hayworth; George C. Lewis; Merchant & Gould PC

(57) ABSTRACT

In a well in a subterranean formation, treatment fluids for time-released iron control are utilized. These treatment fluids contain a time-released form of a complexing agent or reducing agent, wherein the agent forms a soluble product with iron. The time-released form prevents loss of the agent prior to delivery to the desired site and at the desired time(s). Methods for controlling iron in a well in a subterranean formation utilize these treatment fluids containing a time-released form of a complexing agent or reducing agent and these methods create soluble products when the agent interacts with the iron to control the iron from the formation and/or well.

23 Claims, 5 Drawing Sheets

(56) References Cited

U.S. PATENT DOCUMENTS

| | | |
|---|---|---|
| 4,202,795 A | 5/1980 | Burnham et al. |
| 4,506,734 A | 3/1985 | Nolte |
| 4,633,949 A | 1/1987 | Crowe |
| 4,670,166 A | 6/1987 | McGougall |
| 4,690,825 A | 9/1987 | Won |
| 4,713,251 A | 12/1987 | Seighman |
| 4,741,401 A | 5/1988 | Walles |
| 4,770,786 A | 9/1988 | Jacobs |
| 4,919,209 A | 4/1990 | King |
| 4,986,356 A | 1/1991 | Lockhardt et al. |
| 5,110,486 A | 5/1992 | Manalastas |
| 5,164,099 A | 11/1992 | Gupta |
| 5,223,159 A | 6/1993 | Smith et al. |
| 5,224,546 A | 7/1993 | Smith et al. |
| 5,346,010 A | 9/1994 | Adams et al. |
| 5,373,901 A | 12/1994 | Norman |
| 5,437,331 A | 8/1995 | Gupta |
| 5,497,830 A | 3/1996 | Boles et al. |
| 5,658,861 A | 8/1997 | Nelson |
| 5,944,446 A | 8/1999 | Hocking |
| 6,162,766 A | 12/2000 | Muir |
| 6,225,262 B1 | 5/2001 | Irwin |
| 6,265,355 B1 | 7/2001 | Lai et al. |
| 6,331,513 B1 | 12/2001 | Zaid et al. |
| 6,435,277 B1 | 8/2002 | Qu et al. |
| 6,436,880 B1 | 8/2002 | Frenier |
| 6,527,051 B1 | 3/2003 | Reddy et al. |
| 6,569,814 B1 | 5/2003 | Brady et al. |
| 6,638,896 B1 | 10/2003 | Tibbles et al. |
| 7,013,974 B2 | 3/2006 | Hanes, Jr. |
| 7,159,658 B2 | 1/2007 | Frost et al. |
| 7,192,908 B2 | 3/2007 | Frenier et al. |
| 7,208,529 B2 | 4/2007 | Crews |
| 7,306,041 B2 | 12/2007 | Milne et al. |
| 7,527,103 B2 | 5/2009 | Huang et al. |
| 7,721,804 B2 | 5/2010 | Duenckel |
| 7,906,463 B2 | 3/2011 | Starkey, II et al. |
| 7,928,040 B2 | 4/2011 | Sanders et al. |
| 8,071,511 B2 | 12/2011 | Welton et al. |
| 8,312,929 B2 | 11/2012 | Freiner et al. |
| 8,567,503 B2 | 10/2013 | Welton et al. |
| 8,567,504 B2 | 10/2013 | Welton et al. |
| 8,584,757 B2 | 11/2013 | Reyes |
| 9,932,516 B2 | 4/2018 | Conway |
| 2002/0160920 A1 | 10/2002 | Dawson et al. |
| 2003/0032562 A1 | 2/2003 | Grossman et al. |
| 2005/0006093 A1 | 1/2005 | Nguyen |
| 2005/0150520 A1 | 7/2005 | Gill et al. |
| 2006/0124302 A1 | 6/2006 | Gupta et al. |
| 2006/0142166 A1 | 6/2006 | Thomas |
| 2008/0110621 A1 | 5/2008 | Montgomery |
| 2008/0314594 A1 | 12/2008 | Still |
| 2009/0298721 A1 | 12/2009 | Robb et al. |
| 2010/0294498 A1 | 11/2010 | Svoboda et al. |
| 2011/0053811 A1 | 3/2011 | Horton et al. |
| 2011/0214862 A1 | 9/2011 | Horton |
| 2011/0237470 A1 | 9/2011 | Li et al. |
| 2011/0259592 A1 | 10/2011 | Reyes |
| 2011/0263466 A1 | 10/2011 | Rose |
| 2012/0125626 A1 | 5/2012 | Constantine |
| 2013/0056213 A1 | 3/2013 | Medvedev et al. |
| 2013/0157905 A1 | 6/2013 | Saini |
| 2013/0210684 A1 | 8/2013 | Ballard |
| 2013/0213657 A1 | 8/2013 | Dobson et al. |
| 2013/0261032 A1 | 10/2013 | Ladva et al. |
| 2013/0269936 A1 | 10/2013 | Reyes et al. |
| 2013/0269941 A1 | 10/2013 | Reyes et al. |
| 2013/0269944 A1 | 10/2013 | Reyes et al. |
| 2013/0274154 A1 | 10/2013 | Nasr-El-Din et al. |
| 2013/0274155 A1 | 10/2013 | Nasr-El-Din et al. |
| 2013/0303412 A1 | 11/2013 | Luyster et al. |
| 2014/0116696 A1 | 5/2014 | Reyes |
| 2014/0124205 A1 | 5/2014 | Nasr-El-Din et al. |
| 2014/0151042 A1 | 6/2014 | Faugerstrom et al. |
| 2015/0005204 A1 | 1/2015 | Alwattari |
| 2015/0114648 A1 | 4/2015 | Mirakyan |
| 2015/0114653 A1 | 4/2015 | Conway |
| 2016/0068745 A1 | 3/2016 | Conway |
| 2018/0237688 A1 | 8/2018 | Duenckel |
| 2021/0246357 A1 | 8/2021 | Conway et al. |

FOREIGN PATENT DOCUMENTS

| | | |
|---|---|---|
| CN | 101239757 A | 8/2008 |
| WO | 2009086954 | 7/2009 |
| WO | 2012116032 | 8/2012 |
| WO | 2013019188 | 2/2013 |
| WO | 2013081609 | 6/2013 |
| WO | 2013173634 | 11/2013 |

OTHER PUBLICATIONS

Gulbis, Janet, King, M.T., Hawkins, G.W., and H.D. Brannon. "Encapsulated Breaker for Aqueous Polymeric Fluids." SPE Prod Eng 7 (1992): 9-14. doi: https://doi.org/10.2118/19433-PA.

Geiver, The Slickwater Story, The Bakken magazine, http://thebakken.com/articles/711/the-slickwater-story, Jul. 14, 2014, 2pgs.

Huang R.Y.M.; Jarvis, N.R. 1973. Ionically crosslinked hydrophilic polymer membranes: Synthesis and measurement of transport properties, J Polym Sci 41:117-127, 11 pgs.

Ahmed, E.M. 2015. Hydrogel: Preparation, characterization, and applications: A review, J Adv Res 6: 105-121, 17pgs.

Akin, H.; Hasirci, V.N.; Hasirci, N. 1990. Permeability properties of charged hydrogel-carrying membranes, Polymer 31 (2): 270-275, 6pgs.

Rick McCurdy, High Rate Hydraulic Fracturing Additives in Non-Marcellus Unconventional Shales, May 2011, pp. 17-21, Proceedings of the Technical Workshops for the Hydraulic Fracturing Study: Chemical & Analytical Methods http://water.epa.gov/type/groundwater/uic/class2/hydraulicfracturing/upload/proceedingsofhfchemanalmethodsfinalmay2011.pdf, 122pgs.

Jason Weidner, Chemical Additive Selection in Matrix Acidizing, Thesis, May 2011, http://repository.tamu.edu/bitstream/handle/1969.1/150930/Weidner,%20Jason.pdf?sequence=1, 95pgs.

Al-Harthy, et al., Options for High Temperature Well Stimulation, Dec. 1, 2008, Oilfield Review Winter 2008/2009; 20, No. 4, http://www.slb.com/~/media/Files/resources/oilfield_review/ors08/win08/options_for_high_temperature_well_stimulation.pdf, 11pgs.

Portier, et al., Review on Chemical Stimulation Techniques in Oil Industry and Applications to Geothermal Systems—Technical Report, Deep Heat Mining Association, Work Package 4, May 2007, http://engine.brgm.fr/Deliverables/Period2/ENGINE_D28_WP4_ChemicalStimulation_DHMA_052007.pdf, 34pgs.

Xu, et al., On modeling of chemical stimulation of enhanced geothermal system using high pH with chelating agent, Geofluids; Journal vol. 9; Related Information: Journal Publication Date: May 1, 2009; http://www.osti.gov/scitech/servlets/purl/962720, 30pgs.

Waterfront Product Information, Geogard SX—Amorphous Silica Control, 2014, http://www.wateradditives.com/components/com_jshopping/files/demo_products/Geogard_SX_GP_W.pdf, 2pgs.

Ehsaan Nasir, Thesis for Texas A&M, May 2012, Effect of acid additives on spent acid flowback, http://repository.tamu.edu/bitstream/handle/1969.1/ETD-TAMU-2012-05-10933/NASIR-THESIS.pdf?sequence=2&isAllowed=y, 125pgs.

Frenier, et al., Use of Highly Acid-Soluble Chelating Agents in Well Stimulation Services, SPE Annual Technical Conference and Exhibition, Oct. 1-4, 2000, Dallas, Texas, https://www.onepetro.org/conference-paper/SPE-63242-MS, 12pgs.

Civan et al., Rigorous Modeling of Gas Transport in Nano-darcy Shale Porous Media under Extreme Pore Proximity and Elevated Pressure Conditions, Proceedings of the International Conference on Heat Transfer and Fluid Flow, Prague, Czech Republic, Aug. 11-12, 2014, Paper No. 208, http://avestia.com/HTFF2014_Proceedings/papers/208.pdf, 2pgs.

James Caputo, AAPL 57th Annual Meeting, Boston, Jun. 8-11, 2011, Shale Plays: Basic Geologic and Engineering Concepts, http://www.landman.org/docs/white-papers/03-caputo_aapl_shale_play_seminar_part1_final.pdf, 71 pgs.

(56) References Cited

OTHER PUBLICATIONS

Tan Nguyen, New Mexico Tech, Well Design—Spring 2013 Power Point Presentation, 44pgs.

* cited by examiner

IRON CONTROL AS PART OF A WELL TREATMENT USING TIME-RELEASED AGENTS

RELATED APPLICATION

The present application claims benefit of U.S. Provisional No. 62/971,451 filed Feb. 7, 2020, the contents of which are herein incorporated by reference in their entirety.

INTRODUCTION

Water-based treatment fluids are used in hydrocarbon recovery in oil and gas wells. In particular, water-based treatment fluids are used in fracturing of oil and gas wells. The well contains a well casing and, in some wells, tubing inside the casing. Perforations or ports in the casing are adjacent to targeted intervals of subterranean formations containing a hydrocarbon.

Fracturing is conducted by pumping at high pressures and high velocities through a vertical and, in some instances, a horizontal section of a well. Hydraulic pressure exerted on the formation, above the fracturing gradient, causes the formation to fracture, creating an extensive fracture network. These formations can have low or minimal permeability, including sandstone, shale or coals. Once the fracture or crack is initiated, pumping is continued, allowing the fracture to propagate.

Once the fracture has gained sufficient fracture width, a proppant such as sand is added to the fluid and is transported to the fracture system, partially filling the fracture network. After the desired amount of proppant is placed in the fracture, additional water-based fluid is pumped to flush the casing of any proppant that may have settled in the casing. On completion of the fracturing process, the fracture closes onto the proppant. When the well is opened, as the pressure is relieved, a portion of the treatment fluid is flowed back from the well, creating a conductive pathway needed to accelerate oil and gas recovery from the formation.

Water-based treatment fluids are used both in the initial fracturing process and in remediation processes to prolong the useful life of the oil and gas well for producing hydrocarbons.

Iron control presents a significant and complex problem in well operations, both in the initial fracturing process and in remediation processes. Iron and iron compounds may originate from the well equipment or formation.

During the fracturing process, proppant causes erosion of the inside of metal pipe. Pipe metal pumped downhole can serve as a prolonged source of iron.

The water-based treatment fluid may contain an acid, such as HCl, or an oxidizer, such as $ClO_2$, that dissolves, solubilizes, and mobilizes iron from multiple sources. Sources of iron can include, for example, rust in storage and mixing tanks, iron corrosion products including acid corrosion in well tubulars (i.e., pipe), iron scale (iron sulfide and iron hydroxide), source waters, and iron-containing minerals found naturally in the formation. If iron is not controlled, it may form iron (III) hydroxide that causes plugging.

Thus, it is desirable to control iron in a well in a subterranean formation.

SUMMARY

This disclosure describes embodiments of methods and time-release compositions that control iron in a well in a subterranean formation.

In one aspect, this disclosure describes a treatment fluid for time-released iron control in a well in a subterranean formation comprising a time-released form of a complexing agent or reducing agent, wherein the agent forms a soluble product with iron. In certain aspects the time-released form of the complexing or reducing agent is in a form that provides a varying time-release profile for the agent. These varying time-release profile may provide for peaks of release of the agent (two, three, or four peaks of release) or may provide for a continuous timed release profile from a start time to an end time.

In another aspect, this disclosure describes a method for controlling iron in a well in a subterranean formation. The method comprises the steps of providing a treatment fluid comprising a time-released form of a complexing agent or reducing agent, wherein the agent forms a soluble product with iron; injecting the treatment fluid into the well of the formation until at least some of the treatment fluid contacts the formation and iron; and maintaining the treatment fluid in contact with iron within the formation, thereby allowing the complexing agent or reducing agent to release and interact with iron to form a soluble product. In certain embodiments of the methods described herein, the time-released form of the complexing or reducing agent is in a form that provides a varying time-release profile for the agent. These varying time-release profile may provide for peaks of release of the agent (two, three, or four peaks of release) or may provide for a continuous timed release profile from a start time to an end time.

In these compositions and methods the time-released agent may be a complexing or reducing agent that forms a soluble product by interacting with iron. Also in these compositions and methods, the time-release may be achieved by any form, type or delivery system that prevents loss of the agent prior to delivery within the well or the formation where the iron control is needed and at the desired time(s). In certain embodiments, the time-released form of the complexing or reducing agent is in a form that provides a varying time-release profile for the agent.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWING

The following Figures, which form a part of this application, are illustrative of described technology and are not meant to limit the scope of the disclosure as claimed in any manner.

DETAILED DESCRIPTION

Figure 1:
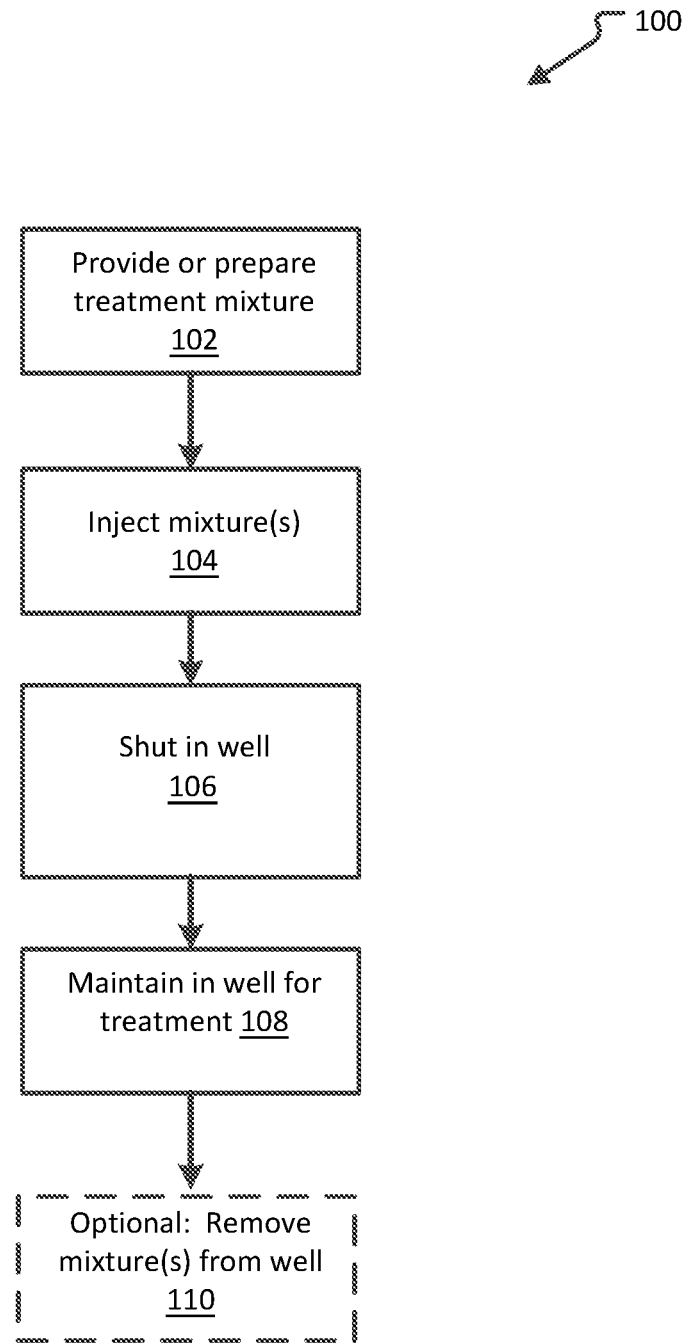
FIG. 1 represents an embodiment of a method controlling iron in a well in a subterranean formation using a treatment fluid comprising a time-released form of a metal complexing agent or reducing agent, wherein the agent forms a soluble product with iron.

Before the methods and time-release compositions that control iron in a well in a subterranean formation are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise. Thus, for example, reference to "a complexing agent" is not to be taken as quantitatively or source limiting; reference to "a step" may include multiple steps, reference to "producing" or a "complex" should not be taken to be all of the products of a reaction, and reference to "reacting" may include reference to one or more of such reaction steps. As such, the step of complexing can include multiple or repeated reaction of similar materials to produce identified complexed products.

This disclosure describes embodiments of methods and time-release compositions that can be used to control iron within a well and/or the formation, both naturally occurring and introduced iron, thereby improving performance of the well and/or the fracturing operation.

In fracturing of hydrocarbon-bearing formations, including shales and in remediation processes, it has been observed that iron needs to be controlled. Iron and iron compounds may originate from the well equipment or from the formation, for example, rust in storage and mixing tanks, iron corrosion products including acid corrosion in well tubulars (i.e., pipe), iron scale (iron sulfide and iron hydroxide), source waters, and iron-containing minerals in formation. Ferrous iron ($Fe^{2+}$) may be present and may be oxidized to ferric iron ($Fe^{3+}$). Ferric iron may form undesirable, insoluble products within the well and/or formation. The present methods and time-release compositions interact with these insoluble iron products and form soluble iron products to control the iron from the well and/or formation. As such, the present methods and time-release compositions control and interact with ferrous iron ($Fe^{2+}$) and ferric iron ($Fe^{3+}$).

Without being held to a particular theory, it appears that the iron originating from pipe erosion can provide a prolonged source of iron. Time-released iron control is advantageous because the iron control agents otherwise may interfere with chemicals used in the fracturing treatment. As such, the methods and compositions disclosed herein avoid this interference by releasing the agent at a desired time(s).

Additionally, without being held to a particular theory, it appears that the iron, which is solubilized under conditions of the well treatments, may later form undesirable products, such as iron (III) hydroxide precipitation. The compositions and methods as disclosed herein form a soluble iron product that is less harmful and easier to address, and thus more desirable, than iron (III) hydroxide. Also, the time-released agents allow the agents to be delivered to the site of action and released at a desired time(s). For example, some iron control chemicals (e.g., EDTA) have low solubility in acid treatment fluids and through time-release, these chemicals can be delivered to the site of action efficiently and effectively.

This disclosure describes embodiments of methods and compositions that can be used to control iron within a well and/or the formation, both naturally occurring and introduced iron, thereby improving performance of the well and/or the fracturing operation. In certain embodiments, the formation is a subterranean shale formation. In one embodiment, the metal complexing agent or reducing agent is introduced during the fracturing process or operation and thus is injected at a pressure greater than a fracture pressure of the formation. In another embodiment, the metal complexing agent or reducing agent is introduced as part of a remediation process and thus is injected at a pressure less than a fracture pressure of the formation and introduced after the fracturing process is complete.

In all embodiments of the methods and compositions to control iron disclosed herein the metal complexing agent or reducing agent is a time-released form of the complexing agent or reducing agent. The time-release of the metal complexing agent or reducing agent will form soluble products by interacting with any iron or iron ions within a well and/or the formation, both naturally occurring and introduced iron. By forming soluble products by interacting with iron, the methods and compositions will improve the fracturing and/or production of the well.

Figure 3:
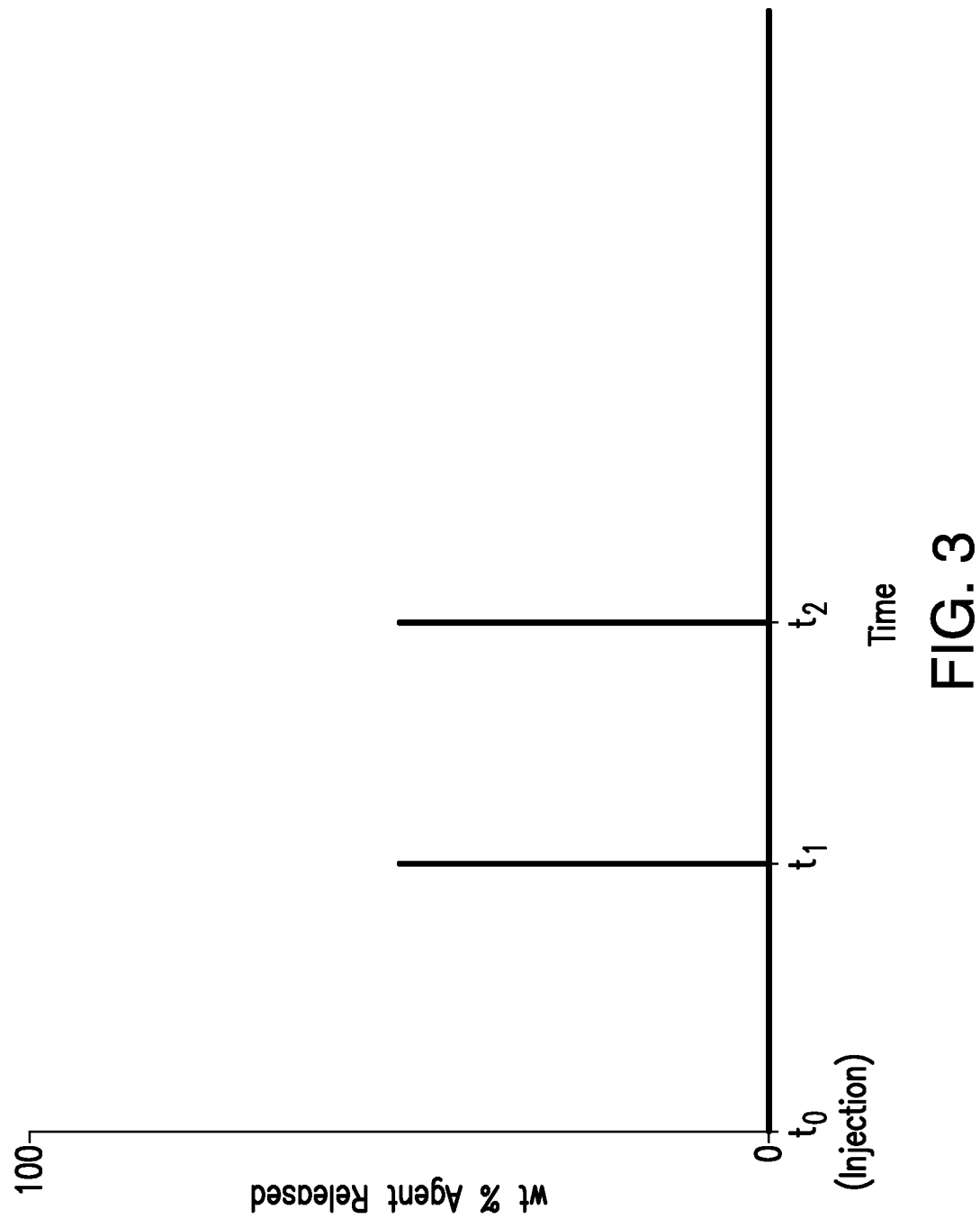
FIG. 3 graphically represents a varying time-released profile with two peaks of release of agent. As illustrated, the injection time is $t_0$. A first release time is at $t_1$ and a second time-release profile is at $t_2$. In certain embodiments, $t_1$ may be about 10 minutes after injection and $t_2$ may be as late as about 1 month after injection.
Figure 4:
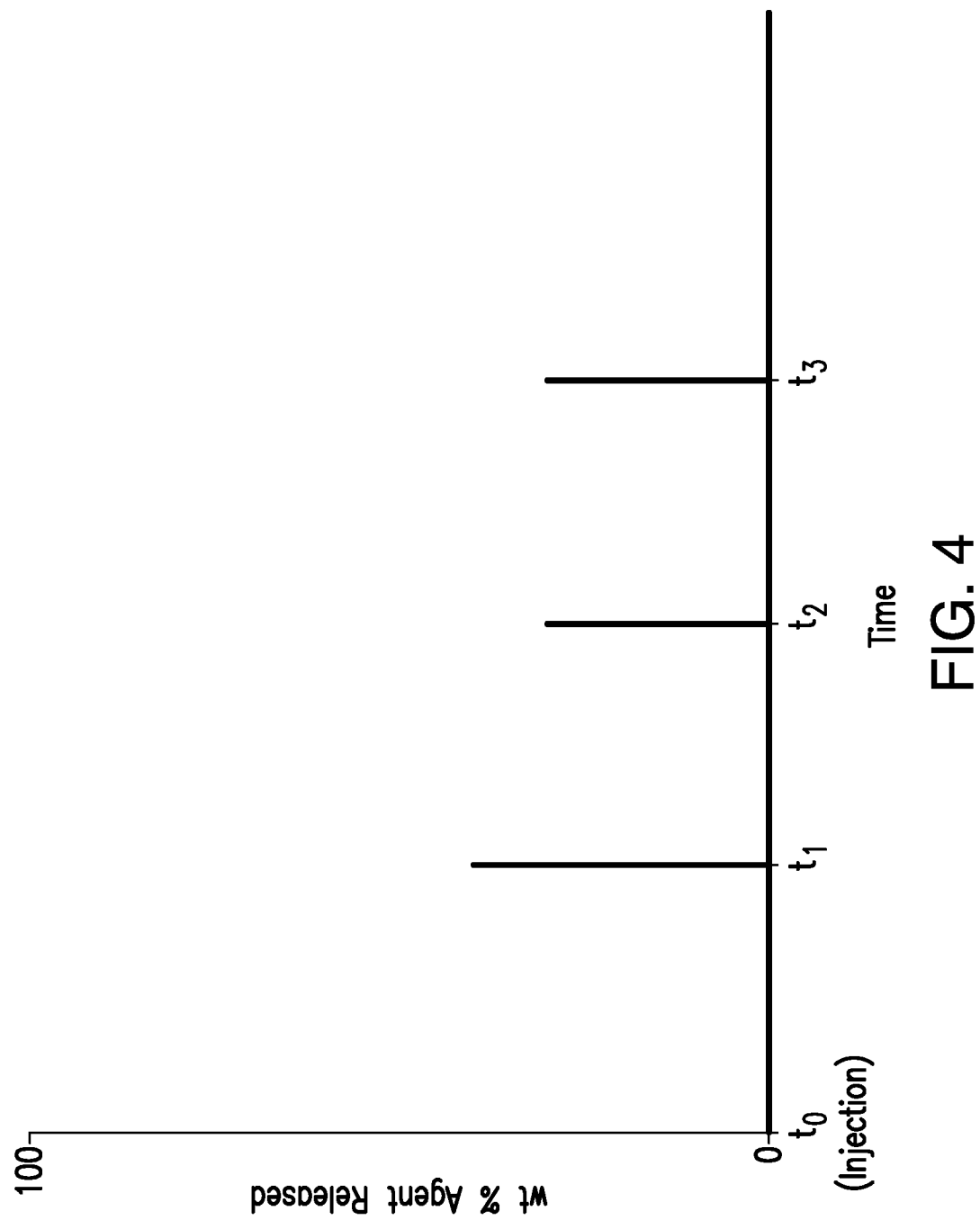
FIG. 4 graphically represents a varying time-released profile with three peaks of release of agent. As illustrated, the injection time is $t_0$. A first release time is at $t_1$, and a second time-release profile is at $t_2$, and a third time-release profile is at $t_3$. In certain embodiments, $t_1$ may be about 10 minutes after injection, $t_2$ may be a time more than about 10 minutes after injection and less than about 1 month after injection, and $t_3$ may be as late as about 1 month after injection.

In certain embodiments, the time-released iron control provides for a varying time-release profile, such that an amount of the complexing or reducing agents is released at a first (earlier) time and another amount of the complexing or reducing agents is released at a second (later) time. In these embodiments of varying time-release profile, there can be two planned timed releases (2 peaks of release), or multiple planned timed releases (three or four peaks of release). In these embodiments of timed release, preferably there are 2 or 3 planned timed releases (2 or 3 peaks of release, See FIGS. 3 and 4, respectively) and in more preferred embodiments, there are 2 planned timed releases (2 peaks of release, See FIG. 3). In these embodiments of varying time-release profile, the first planned timed release can be as soon as about 10 minutes after injection and the second or last planned time-release can be as late as about 1 month after injection.

Figure 5:
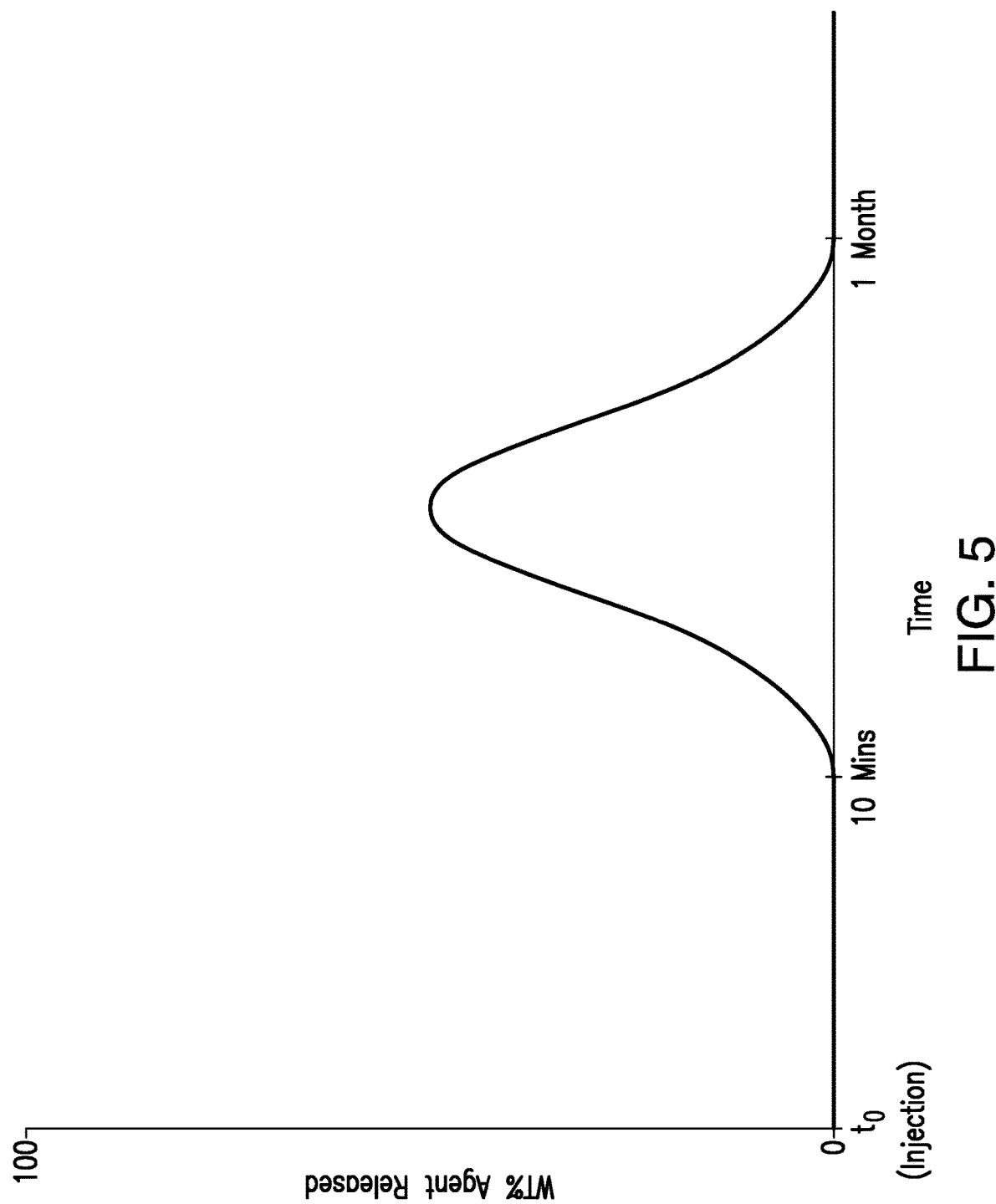
FIG. 5 graphically represents a varying time-released profile with a continuous timed release profile. As illustrated, the injection time is $t_0$. The continuous release begins at a time $t_1$ and ends at a time $t_2$. In certain embodiments, $t_1$ may be about 10 minutes after injection and $t_2$ may be as late as about 1 month after injection.

In other embodiments, the varying timed release can be a continuous timed release profile (in the shape of a curve) beginning as early as at about 10 minutes after injection and ending as long as about 1 month after injection (See FIG. 5).

The complexing agent or reducing agent as utilized herein is in a time-released form and forms a soluble product by interacting with iron or iron ions. As such, the complexing agent or reducing agent can be any chemical that forms a soluble product. The time-released form may be any form or delivery system that prevents loss of the agent prior to delivery within the well or the formation where the iron control is needed and at the desired time(s).

The extent of solubility can be viewed as ranging from infinitely/very soluble or miscible (such as ethanol in water) to insoluble. The U.S. Pharmacopoeia defines solubility terms as follows and the ranges are adopted herein.

| Term | Mass parts of solvent required to dissolve 1 mass part of solute |
| --- | --- |
| Very soluble | <1 |
| Freely soluble | 1 to 10 |
| Soluble | 10 to 30 |
| Sparingly soluble | 30 to 100 |
| Slightly soluble | 100 to 1000 |
| Very slightly soluble | 1000 to 10,000 |
| Insoluble | ≥10,000 |

The solvent as herein is the fluid within the formation or wellbore in which product forms and the iron product is the solute.

The term "soluble" as used herein with regard to creating a "soluble" product with iron includes soluble, freely soluble and very soluble, as defined by the U.S. Pharmacopoeia as set forth above. Thus, the term "soluble" as used herein with regard to creating a "soluble" product with iron includes the mass parts of solvent required to dissolve 1 mass part of solute (i.e., the iron product) as defined for soluble, freely soluble and very soluble according to the U.S. Pharmacopoeia. As such, as defined herein, "soluble" means less than (<) 30 mass parts solvent to dissolve 1 mass part of solute.

Since the complexing agent or reducing agent will be used in a downhole environment and into the formation, it is preferred that the complexing agent or reducing agent and the time-release mechanism not be detrimental to the environment. The complexing agent may be a chelating complexing agent or a non-chelating complexing agent. The complexing agent as utilized in the treatment fluid may be a single chemical or may be a mixture of different chemicals functioning as complexing agents.

The reducing agent as used herein is a chemical species that reduces $Fe^{3+}$ to $Fe^{2+}$ creating a soluble iron product. The reducing agent as utilized in the treatment fluid may be a single chemical or may be a mixture of different chemicals functioning as reducing agents.

The complexing agent can be a metal chelating agent or a non-chelating complexing agent.

In embodiments where the complexing agent is a metal chelating agent, it can be selected from the group consisting of citric acid, glycine, NTA (nitrilotriacetic acid), EDTA (ethylenediaminetetraacetic acid), PDTA (1,3-propylenediaminetetraacetic acid), HEDTA (hydroxyethylethylenediaminetriacetic acid), DTPA (diethylenetriaminepentaacetic acid), HEIDA (hydroxyethyliminodiacetic acid), CDTA (cyclohexanediaminetetraacetic acid), DPAS (diphenylaminesulfonic acid), EDDHA (ethylenediaminedi(o-hydroxyphenylacetic) acid), HACA (hydroxyaminopolycarboxylic acid), oxalic acid, malonic acid, succinic acid, malic acid, maleic acid, tartronic acid, tartaric acid, glutaric acid, adipic acid, pimelic acid, suberic acid, azelaic acid, sebacic acid, phthalic acid, terephthalic acid, aconitic acid, carballylic acid, trimesic acid, isocitric acid, phosphonic acids, and mixtures thereof. In certain embodiments, the metal chelating agent is selected from the group consisting of citric acid, glycine, NTA (nitrilotriacetic acid), EDTA (ethylenediaminetetraacetic acid), oxalic acid, malonic acid, succinic acid, phosphonic acids, and mixtures thereof.

In embodiments where the complexing agent is a non-chelating complexing agent, it can be selected from the group consisting of formic acid, acetic acid, propionic acid, lactic acid, gluconic acid, glucoheptonic acid, and mixtures thereof. In certain embodiments, the non-chelating complexing agent is formic acid, acetic, acid, or mixtures thereof.

The complexing agent can also be a mixture of a chelating agent and a non-chelating agent. If a mixture of a chelating agent and non-chelating agent are utilized, the chelating agent can be any one or more of the chelating agents as disclosed herein in combination with any one or more of the non-chelating agents as disclosed herein.

In embodiments where the agent is a reducing agent, it can be selected from the group consisting of erythorbic acid, ascorbic acid, hydroxylamine, and mixtures thereof.

In embodiments of the methods and time-release compositions, the complexing agent or reducing agent may be present in the treatment fluid in an amount of about 0.01 pound per thousand gallons to about 50 pounds per thousand gallons. In certain embodiments, the complexing agent or reducing agent may be present in the treatment fluid in an amount of about 0.05 pound per thousand gallons to about 25 pounds per thousand gallons. In other embodiments, the complexing agent or reducing agent may be present in the treatment fluid in an amount of about 0.1 pound per thousand gallons to about 20 pounds per thousand gallons. In specific embodiments, the complexing agent or reducing agent may be present in the treatment fluid in an amount of about 1 pound per thousand gallons to about 10 pounds per thousand gallons.

Treatment fluids as disclosed herein comprise a time-released form of the complexing agent or reducing agent. The treatment fluids also contain water and optionally mutual solvent. Mutual solvents are soluble in oil, water and acid-based mixtures. When the treatment fluid containing the time-released form of the complexing agent or reducing is used during a fracturing process, the treatment fluid can further include any additives commonly utilized during the fracturing process. When the treatment fluid containing the time-released form of the complexing agent or reducing agent is used during a remediation operation, the treatment fluid can further include any additives commonly used in remediation processes.

The additives used in fracturing and/or remediation include, for example, acids (such as HCl), corrosion inhibitors, friction reducers, biocides, surfactants, and the like. The amount of additives appropriate readily can be selected by one of ordinary skill in the art and is within known ranges. For example, the treatment fluid can further contain water, between 1 and 10,000 parts per million (ppm) of a corrosion inhibitor, between 1 and 10,000 ppm of a biocide, and mutual solvent. The treatment fluid can further contain hydrochloric acid from trace amounts to about 30% by weight.

The amount of complexing agent or reducing agent in the treatment fluid can be varied as needed as the treatment fluid is injected. For example, it may be advantageous to use a higher initial concentration and decrease the concentration as the injection is performed. In other embodiments, it may be advantageous to increase the concentration as the injection is performed.

In certain of these embodiments, the complexing agent is a metal chelating agent and the metal chelating agent is present in the treatment fluid in an amount of about 0.01 pound per thousand gallons to about 50 pounds per thousand gallons. In certain embodiments, the metal chelating agent is present in the treatment fluid in an amount of about 0.05 pound per thousand gallons to about 25 pounds per thousand gallons. In other embodiments, the metal chelating agent is present in the treatment fluid in an amount of about 0.1 pound per thousand gallons to about 20 pounds per thousand gallons. In specific embodiments, the metal chelating agent is present in the treatment fluid in an amount of about 1 pound per thousand gallons to about 10 pounds per thousand gallons.

In certain of these embodiments, the agent is a reducing agent and the reducing agent is present in the treatment fluid in an amount of about 0.01 pound per thousand gallons to about 50 pounds per thousand gallons. In certain embodiments, the reducing agent is present in the treatment fluid in an amount of about 0.05 pound per thousand gallons to about 25 pounds per thousand gallons. In other embodiments, the reducing agent is present in the treatment fluid in an amount of about 0.1 pound per thousand gallons to about 20 pounds per thousand gallons. In specific embodiments, the reducing agent is present in the treatment fluid in an amount of about 1 pound per thousand gallons to about 10 pounds per thousand gallons.

In the compositions and methods as disclosed herein, the complexing agent or reducing agent is provided in a form, type or delivery system that prevents loss of the agent prior to delivery at the site within the well or formation to complex with iron (i.e., prevents loss during the injection process) and at the desired time(s). In certain embodiments, in the compositions and methods, the complexing agent or reducing agent is provided in a form, type, or delivery system that provides for a varying time-release profile, such that an amount of the complexing or reducing agents is released at a first (earlier) time and another amount of the complexing or reducing agents is released at a second (later) time. In these embodiments of varying time-release profile, there can be two planned timed releases (2 peaks of release, See FIG. 3), or multiple planned timed releases (three or four peaks of release, See FIG. 4). In these embodiments of timed release, preferably there are 2 or 3 planned timed releases (2 or 3 peaks of release, See FIGS. 3 and 4 respectively) and in more preferred embodiments, there are 2 planned timed releases (2 peaks of release, See FIG. 3). In these embodiments of varying time-release profile, the first planned timed release can be as soon as about 10 minutes after injection and the last planned timed release can be as late as about 1 month after injection.

In other embodiments, the timed release can be a continuous timed release profile (in the shape of a curve, See FIG. 5) beginning as early as at about 10 minutes after injection and ending as long as about 1 month after injection.

In certain embodiments to obtain the time-released feature, the complexing agent or reducing agent may be encapsulated within a suitable coating. In embodiments with a coating, the complexing agent or reducing agent may be encapsulated in a coating of one layer, two layers, or multiple layers (such as three or four layers). In embodiments of varying timed release, the types of coatings used on amounts of complexing agent or reducing agent, or coating layers applied to the complexing or reducing agents, may be different to provide for the varying timed release.

When a coating is utilized, any coating may be applied to the agent that will prevent release of the agent prior to delivery at the site within the well or formation to complex with iron and will prevent release of the agent until a desired time(s) after injection. In one embodiment, the agent may have a coating that can be disrupted by pressure changes or mechanical forces. These types of coating may be a nonpermeable shell, which releases the agent by crushing or rupture. In another embodiment, the coating may be dissolvable in the fluid system and releases the agent by dissolution. In other embodiments, the coating may be a permeable shell from which the agent is released by diffusion over time, based on the diffusion rate through the shell material and the thickness of the shell. In yet other embodiments, the coating may be a semipermeable shell, which releases the agent by opening caused by osmotic swelling. In another embodiment, the coating may be a coating that is removed by eroding or dissolving from exposure to the environment.

In specific embodiments, the coating may be a polymer. In embodiments, the coating may be a latex selected from polyvinylidene chloride or vinylidene methyl acrylate acrylonitrile copolymer. In other embodiments, the coating may be a starch or polysaccharide. In further embodiments, the coating may be a polymer wax mixture or fatty acid. In embodiments, the coating may be a dry hydrophobic film forming material or a dry slowly dissolvable material and particulate silica. The coating further may be a paraffin coating.

The coating may be a porous cross-linked hydrophilic polymer such that when contacted with water it prevents the substantial dissolution of the encapsulated agent for a selected time period. In another embodiment, the complexing agent can be preserved by a coating that can be disrupted by pressure changes or mechanical forces, such as fracture closure.

Several time-release encapsulation materials and techniques for use in hydraulic fracturing are known in the art and any suitable technique may be used that delivers the agent to site within the formation and/or well where it is to be released to complex with iron in the desired time-released manner.

When two or multiple layers of coatings are applied as described, the individual coating layers may be the same or different. If different, the first coating layer may be any of the herein described coatings and the second coating layer used with the first coating also may be any of the herein described coatings. As such, the combination of the first coating with a second coating is not limited. If a coating, which releases the agent by pressure changes or mechanical forces, such as fracture closure, is utilized in a layered system, then that coating should be the outer most coating (i.e., the coating to be released first).

Multiple coatings layers may include a first coating layer of a fatty acid (e.g., stearic acid, stearic acid/palmitic acid, lauric acid, myristic acid, palmitic acid, stearic acid, arachidic acid) and a second coating layer of fixed alkali hydroxide (i.e., NaOH, KOH, $CaOH_2$), or a soap of the fatty acid. These types of multiple coating layers form a nonpermeable shell that release the agent by dissolution. These multiple coating layers forming a nonpermeable shell may further be utilized with an outer coating of a nonpermeable shell released by crushing.

As described, in certain embodiments, the coating may be a nonpermeable shell that releases the complexing or reducing agent by crushing or dissolution of coating material. Nonpermeable shell coatings that release the complexing or reducing agent by crushing are useful for timed release of the agents after fracturing is complete when the pressure inside the formation is released. Examples of coatings that release by crushing include glass, gels, ceramics, plastics (See for example Nolte, U.S. Pat. No. 4,506,734), polyvinylidene chloride copolymers (See for example Gulbis, 1992. SPE-19433-PA), and the like. In certain embodiments, coatings of polyvinylidene chloride copolymers that release the agent by crushing of the coating material are preferred. If a coating that releases the agent by crushing is utilized in a layered coating, then that coating should be the outer most coating (i.e., the coating to be released first). If a coating that releases the agent by crushing is utilized in an embodiment with a varying time-release profile of two or multiple planned timed releases, then the agents coating with that coating would be released at the first planned release.

Coatings that form a nonpermeable shell that release the agent by dissolution of the nonpermeable coating are also used herein. Examples of coatings that release by dissolution include solidified starch or polysaccharide matrix with absorbed acid (See for example Seighman, U.S. Pat. No. 4,713,251), hydroxypropylguar or other solid hydratable gelling agents (See for example Burnham, U.S. Pat. No. 4,202,795), polyethylene-vinyl acetate copolymers (See for example King, U.S. Pat. No. 4,919,209), poly(alkyl-2-cyanoacrylate) (See for example Muir, U.S. Pat. No. 6,162,766), polymeric coating such as ethylcellulose, acrylic latex, cellulose, acrylates, styrene/butadienes, polyvinylidene chlorides, styrene/butadiene, polyvinylidene chloride and mixtures thereof (See for example Nelson, U.S. Pat. No. 5,658,861), polyvinyl alcohol, polyvinyl pyrrolidone, polyethylene glycols, copolymers of vinyl methyl ether and maleic anhydride. (See for example Alterman, U.S. Pat. No. 3,983,254), and the like.

In other embodiments, the coating may be a permeable shell that releases the agent by diffusion. In these embodiments, the coating exhibits enough permeability that the coated agent inside slowly diffuses out through the permeable shell. Examples of these coatings include parylene (See for example Mirakyan, US20150114648), nylon (See for example Gupta, U.S. Pat. No. 5,164,099), partially hydrolyzed acrylate/silica particles (See for example Norman, U.S. Pat. No. 5,373,901), and certain polymeric matrices (See for example McDougall, U.S. Pat. No. 4,670,166). Examples of a polymeric matrix coating that is permeable and releases the agent by diffusion include acrylic acid, acrylamide, or acrylonitrile or mixture thereof and minor amounts of at least one difunctional hydrophilic comonomer, such as methylene bis-acrylamide.

In other embodiments, the coating may be semipermeable that releases the agent by permeation or rupture caused by osmotic swelling. Fluid enters semipermeable coatings and creates an osmotic gradient, releasing the agent. In these embodiments, the coating is permeable to some component of the environment/fracturing fluid and that penetrates the coating causing it to swell or rupture releasing the agent. Examples of these coatings include crosslinked elastomer (ionically and covalently crosslinked neutralized sulfonated elastomeric polymer, See for example Manalastas, U.S. Pat. No. 5,110,486), sulfonated EPDM rubber (ethylene propylene diene monomer rubber), sulfonated butyl rubber, sulfonated EPDM terpolymer with vinyl pyridine copolymer, sulfonated isoprene/styrene rubber, sulfonated isoprene/butadiene rubber, and sulfonated polystyrene, and vinylidene/methyl acrylate/acrylonitrile (See for example Walles, U.S. Pat. No. 4,741,401).

In further embodiments, the coating may release the encapsulated agent by dissolving or eroding of encapsulating material. These coatings may dissolve or erode by exposure to fluid. Examples of coatings that release by dissolving or eroding include a polymer/wax mixture (See for example King, U.S. Pat. No. 4,919,209). In the embodiment of a polymer/wax mixture, the polymer may be polyolefin, polyolefin-vinyl acetate copolymer, or mixture thereof. Preferred polyolefin-vinyl acetate copolymers include ethylene-vinyl acetate copolymers. In certain embodiments, using coatings of a polymer/wax mixture that release by eroding or dissolving are preferred.

In the embodiments utilizing a varying time-release profile, such that an amount of the complexing or reducing agents is released at a first (earlier) time and a second amount of the complexing or reducing agents is released at a second (later) time, the planned varying time-release profile may be achieved by using different types of coatings (one coating that will release faster/sooner than a different second coating) or differing layers of coatings (some agents with one layer of coating and other agents with two or multiple layers of coatings). The planned varying time-release profile may be achieved by using both different types of coatings and/or differing layers of coatings. The time-release profile may be planned such that a certain percentage of the agent is designed to release as soon as about 10 minutes after injection and another or remaining percentage of the agent releases as long as about one month after injection. The time-release profile may be continuous over the time period, or there may different peaks of release (for example, two, three, or four peaks of release based on the type of coatings, or layers of coating, utilized).

The percentage of agent designed to release at the first time may be about 25%, about 30%, about 40%, about 50%, about 60%, or about 75% by weight. The percentage of agent designed to have a release later than the first release correspondingly may be about 75%, about 70%, about 60%, about 50%, about 40%, or about 25% by weight. In certain embodiments the percentage of agent designed to release at a first time is about 35-65% by weight and the percentage of agent designed to release at a second later time is about 65-35% by weight. In one embodiment, the percentage of agent designed to release at a first time is about 50% by weight and the percentage of agent designed to release at a second later time is about 50% by weight.

In the alternative the coated agent may be designed/coated to release continuously from an initial release time to a final release time at a steady release rate. The initial release time may be about 10 minutes after injection and the final release time may be about 1 month after injection.

In certain embodiments the varying time-release profile may be achieved by having two different types of coated complexing agents or reducing agents. In certain embodiments, a first amount of agent may be coated with a nonpermeable shell which releases the agent by crushing and a second amount of agent may be coated with a nonpermeable shell which releases the agent by dissolution. For example, a first amount of agent may be coated with polyvinylidene chloride copolymers and a second amount of agent may be coated with a polymeric coating that releases by dissolution, such as ethylcellulose, acrylic latex, polyvinyl alcohol, polyvinyl pyrrolidone, polyethylene glycols, or copolymers of vinyl methyl ether and maleic anhydride. In this embodiment, the first amount of agent would release at a first planned timed release.

In other embodiments, a first amount of agent may be coated with a nonpermeable shell which releases the agent by crushing and a second amount of agent may be coated with a permeable shell which releases the agent by diffusion. For example, a first amount of agent may be coated with polyvinylidene chloride copolymers and a second amount of agent may be coated with parylene. In this embodiment, the first amount of agent would release at a first planned timed release.

In other embodiments, a first amount of agent may be coated with a nonpermeable shell which releases the agent by crushing and a second amount of agent may be coated with an encapsulating material which releases by eroding or dissolving. For example, a first amount of agent may be coated with polyvinylidene chloride copolymers that release by crushing and a second amount of agent may be coated with a polymer/wax mixture which releases by eroding or dissolving. In this embodiment, the first amount of agent would release at a first planned timed release.

In additional embodiments, an amount of agent may be coated with a permeable shell released by diffusion or a nonpermeable shell released by dissolution and a second amount of agent may be coated with two layers—an inner layer of permeable shell released by diffusion and an outer layer of encapsulating material released by eroding or dissolving (such as a polymer/wax mixture).

In other embodiments, the agents may be coated with varying thicknesses of the desired coating(s) providing for a varied time-release, beginning at an initial first release time that is at least about 10 minutes after injection and ending at a final release time that is no more than about 1 month after injection. For example, a first amount of agent may be coated with a first thickness of a coating that and a second amount of the agent may be coated with a coating of the same type that is a second thickness, which is twice the first thickness of the same coating. In these embodiments, the coating may be a permeable shell released by dissolution, a nonpermeable shell released by dissolution, or coating that releases by eroding or dissolving. In certain embodiments, if the first thickness is planned to dissolve and release the agent about 1 week after injection, then the second thickness will be planned to dissolve and release the agent in about 2 weeks after injection. In other embodiments, if the first thickness is planned to dissolve and release the agent about 2 weeks after injection, then the second thickness will be planned to dissolve and release the agent in about a month after injection. In another embodiment, the agents may be coated with thicknesses of coatings that gradually increase in thickness, such that the agents release continuously from an initial release time to the final release time at a relatively steady release rate.

In other embodiments of time-release not utilizing coatings, the time-release can be controlled or influenced by differential solubility or rate of dissolution of the complexing agent or reducing agent in the treatment fluid as a result of injecting it into the wellbore and/or reservoir. In other embodiments, the time-released form of the complexing agent or reducing agent may be adsorbed to a material that releases in response to changes in environmental redox potential, pH or ion exchange.

In further embodiments not utilizing coatings, the time-released form of the complexing agent or reducing agent may be adsorbed to matrix or blended with a matrix and the time-released form of the complexing agent or reducing agent is released from the matrix over time by diffusion. The matrix is selected so that the complexing agent or reducing agent has sufficient affinity for the matrix. The matrix may be a polymeric bead, a ceramic bead, a zeolite, or a polymeric blend. Examples of matrices that are known to provide for a timed released include, polymethylmethacrylate (PMMA) (See for example Gupta, U.S. Pat. No. 5,437,331), PMMA polymer blend such as PMMA with PMMA-coethyl acrylate-cotrimethylaminoethyl methacrylate chloride, a polymeric bead such as polymerized styrene and divinylbenzene (See for example, Won, U.S. Pat. No. 4,690,825). One of skill in the art would select the appropriate matrix depending on the agent being utilized based on the agent's affinity for the matrix.

In other embodiments not utilizing coatings, the release time can be controlled or influenced by differential solubility or rate of dissolution of the metal complexing agent in the treatment fluid as a result of injecting it into the wellbore and/or reservoir. For example, EDTA is slowly soluble at room temperature or low temperatures in which it could be mixed, and the solubility increases as the temperature of the fluid increases in the wellbore or reservoir after injection.

The treatment fluid for time-released iron control comprising a time-released form of a complexing agent or reducing agent, wherein the agent forms a soluble product with iron are utilized in methods for controlling iron in a well in a subterranean formation. One embodiment of these methods is graphically illustrated in FIG. 1 (100) and another embodiment of these methods is graphically illustrated in FIG. 2 (200).

As illustrated in FIG. 1, the methods for controlling iron in a well in a subterranean formation as disclosed herein include providing treatment fluid comprising a time-released form of a complexing agent or a reducing agent, wherein the agent forms a soluble product with iron (102). In certain embodiments, the treatment fluid comprises about 0.1 pound per thousand gallons to about 20 pounds per thousand gallons of the agent. The treatment fluid with complexing agent or reducing agent can be prepared by methods well known in the art and the agent can readily be mixed with the treatment fluid.

The treatment fluid is injected into the well of the formation until at least some of the treatment fluid contacts the formation and iron (104). In one embodiment, the treatment fluid including the complexing or reducing agent is introduced during the fracturing process or operation and thus is injected at a pressure greater than a fracture pressure of the formation. In embodiments in which the treatment fluid is introduced during the fracturing process or operation, at least some amount of the timed release form of the complexing or reducing agent can be achieved by coating the agent with a nonpermeable shell which releases the agent by crushing. In another embodiment, the treatment fluid including the complexing or reducing agent is introduced as part of a remediation process and thus is injected at a pressure less than a fracture pressure of the formation.

The treatment fluid including the complexing or reducing agent is shut in the well and maintained in the well in contact with iron, thereby allowing the agent to release over time and then interact with iron to form a soluble product (106 and 108). Thus, although graphically illustrated as separate steps, steps 106 and 108 overlap in time.

In certain embodiments, the soluble product is removed from the well after the contacting in a mobile fluid phase, but this step is optional. (110).

Figure 2:
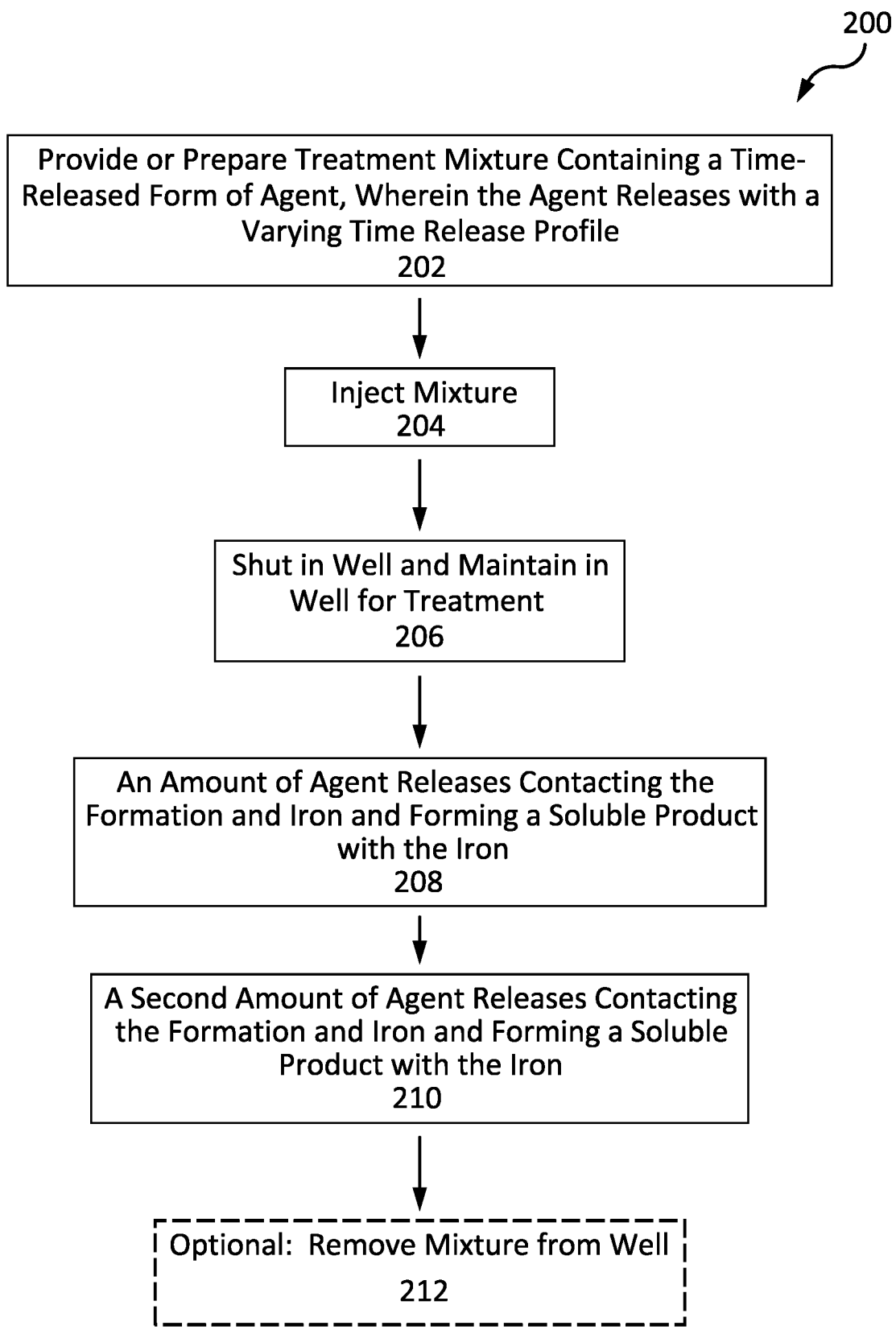
FIG. 2 represents an embodiment of a method controlling iron in a well in a subterranean formation using a treatment fluid comprising a time-released form of a metal complexing agent or reducing agent, wherein the agent forms a soluble product with iron. In this embodiment, the agent is released with a varying time-release profile.

As illustrated in FIG. 2, the methods for controlling iron in a well in a subterranean formation as disclosed herein include providing treatment fluid comprising a time-released form of a complexing agent or a reducing agent, wherein the agent releases with a varying time-release profile and forms a soluble product with iron (202). In certain embodiments, the treatment fluid comprises about 0.1 pound per thousand gallons to about 20 pounds per thousand gallons of the agent. The treatment fluid with complexing agent or reducing agent can be prepared by methods well known in the art and the agent can readily be mixed with the treatment fluid and the varying time-release profile may be achieved as described herein.

The treatment fluid is injected into the well of the formation until at least some of the treatment fluid contacts the formation and iron (204). In one embodiment, the treatment fluid including the complexing or reducing agent is introduced during the fracturing process or operation and thus is injected at a pressure greater than a fracture pressure of the formation. In embodiments in which the treatment fluid is introducing during the fracturing process or operation, at least some amount of the timed release form of the complexing or reducing agent can be achieved by coating the agent with a nonpermeable shell which releases the agent by crushing. In another embodiment, the treatment fluid including the complexing or reducing agent is introduced as part of a remediation process and thus is injected at a pressure less than a fracture pressure of the formation.

The treatment fluid including the complexing or reducing agent is shut in the well and maintained in the well in contact with iron (206, 208, and 210), thereby allowing the agent to release over time and then interact with iron to form a soluble product. With a varying release profile an amount of agent releases and contacts the formation and iron forming a soluble product with iron at a first time and a second amount of agent releases contacting the formation and iron forming a soluble product with iron at a second time (208 and 210). Thus, although graphically illustrated as separate steps, steps 206, 208, and 210 may overlap in time.

In certain embodiments, the soluble product may be removed from the well after the contacting in a mobile fluid phase, but this step is optional.

In certain embodiments of the method, the time-released iron control provides for a varying time-release profile, such that after injection into the well, a certain initial amount of the complexing or reducing agents is released at a first (earlier) time and another amount of complexing or reducing agents is released at a second (later) time. In these embodiments of varying time-release profile, there can be two planned timed releases (2 peaks of release), or multiple planned timed releases (three or four peaks of release). In these embodiments of timed release, preferably there are 2 or 3 planned timed releases (2 or 3 peaks of release) and in more preferred embodiments, there are 2 planned timed releases (2 peaks of release). In these embodiments of varying time-release profile, the first planned timed release can be as soon as about 10 minutes after injection and the last planned time-release can be as late as about 1 month after injection.

In other embodiments of the method, the time-released iron control provides for a continuous timed release profile (in the shape of a curve) of the agent, beginning as early as at about 10 minutes after injection and ending as long as about 1 month after injection.

In certain embodiments, the methods provide for varying time-release of the agent. In an embodiment of varying time-release, the method for controlling iron in a well in a subterranean formation comprises: providing a treatment fluid comprising a time-released form of a complexing agent or reducing agent, wherein the time-released complexing agent or reducing agent provides a varying time-release profile and wherein the agent forms a soluble product with iron. The treatment fluid is injected into the well of the formation until at least some of the treatment fluid contacts the formation and iron and the agent is released over time. The treatment fluid is maintained in contact with iron within the formation, thereby allowing the agent to interact with iron over time to form a soluble product. As described herein the varying timed release can be continuous from an initial release time to a final release time or the varying timed release can be planned timed peaks of release.

In an embodiment of varying time-release, the methods for controlling iron in a well in a subterranean formation comprise: providing a treatment fluid comprising a first amount of time-released complexing agent or reducing agent and a second amount of time-released complexing agent or reducing agent, wherein the first amount of agent is released at a first time and the second amount of agent is released at a second time and wherein the agents form a soluble product with iron. The treatment fluid is injected into the well of the formation until at least some of the treatment fluid contacts the formation and iron and is released over time. The treatment fluid is maintained in contact with iron within the formation, thereby allowing the agent to interact with iron over time to form a soluble product.

In the methods as described herein, in embodiments the subterranean formation can be a subterranean shale formation. The iron to be controlled can be both naturally occurring and introduced iron, and thereby improve performance of the well and/or the fracturing operation.

Unless otherwise indicated, all numbers expressing quantities of ingredients, properties, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

As used herein, "about" refers to a degree of deviation based on experimental error typical for the particular property identified. The latitude provided the term "about" will depend on the specific context and particular property and can be readily discerned by those skilled in the art. The term "about" may include +/−10 percent for example and is not intended to either expand or limit the degree of equivalents which may otherwise be afforded a particular value. Further, unless otherwise stated, the term "about" shall expressly include "exactly," consistent with the discussions regarding ranges and numerical data. Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 4 percent to about 7 percent" should be interpreted to include not only the explicitly recited values of about 4 percent to about 7 percent, but also include individual values and sub-ranges within the indicated range. Thus, included in this numerical range are individual values such as 4.5, 5.25 and 6 and sub-ranges such as from 4-5, from 5-7, and from 5.5-6.5; etc. This same principle applies to ranges reciting only one numerical value. Furthermore, such an interpretation should apply regardless of the breadth of the range or the characteristics being described.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

It will be clear that the methods described herein are well adapted to attain the ends and advantages mentioned as well as those inherent therein. Those skilled in the art will recognize that the methods within this specification may be implemented in many manners and as such is not to be limited by the foregoing exemplified embodiments and examples. While various embodiments have been described for purposes of this disclosure, various changes and modifications may be made which are well within the scope of the present invention. Numerous other changes may be made which will readily suggest themselves to those skilled in the art and which are encompassed in the spirit of the disclosure.

What is claimed is:

1. A treatment fluid for time-released iron control in a well in a subterranean formation comprising water and a time-released form of a complexing agent consisting of formic acid, acetic acid, propionic acid, lactic acid, gluconic acid, glucoheptonic acid, or mixtures thereof encapsulated within a coating or of a reducing agent consisting of erythorbic acid, ascorbic acid, hydroxylamine or mixtures thereof encapsulated within a coating, wherein the time-released form of the agent is present in the treatment fluid in an amount of about 0.01 pound per thousand gallons of the fluid to about 50 pounds per thousand gallons of the fluid and the agent forms a soluble product with iron.

2. The fluid of claim 1, wherein the time-released form of the complexing agent or reducing agent is in a form that provides a varying time-release profile for the agent.

3. The fluid of claim 2, comprising a first amount of the time-released agent in a form to release at a first time and a second amount of the time-released agent in a form to release at a second time.

4. The fluid of claim 2, wherein the time-released complexing agent or reducing agent provides a continuous timed release profile from a start time to an end time.

5. The fluid of claim 1, wherein the treatment fluid comprises water and the time-released form of the complexing agent consisting of formic acid, acetic acid, propionic acid, lactic acid, gluconic acid, glucoheptonic acid, or mixtures thereof encapsulated within a coating.

6. The fluid of claim 1, wherein the treatment fluid comprises water and the time-released form of the reducing agent consisting of erythorbic acid, ascorbic acid, hydroxylamine, or mixtures thereof encapsulated within a coating.

7. The fluid of claim 1, wherein the coating is a nonpermeable shell that releases the agent by crushing or dissolution of the coating.

8. The fluid of claim 7, wherein the coating is polyvinylidene chloride copolymers.

9. The fluid of claim 1, wherein the coating is a nonpermeable shell that releases the agent by dissolution.

10. The fluid of claim 1, wherein the coating is a permeable shell that releases the agent by diffusion.

11. The fluid of claim 1, wherein the coating is a semipermeable shell that releases the agent by permeation or rupture caused by osmotic swelling.

12. The fluid of claim 1, wherein the coating has multiple layers.

13. A treatment fluid for time-released iron control comprising:
(i) water,
(ii) a first amount of a time-released form of a complexing agent consisting of formic acid, acetic acid, propionic acid, lactic acid, gluconic acid, glucoheptonic acid, or mixtures thereof encapsulated within a first coating or of a reducing agent consisting of erythorbic acid, ascorbic acid, hydroxylamine or mixtures thereof encapsulated within a first coating, wherein the first amount of the time-released agent is released at a first time, and
(iii) a second amount of time-released form of a complexing agent consisting of formic acid, acetic acid, propionic acid, lactic acid, gluconic acid, glucoheptonic acid, or mixtures thereof encapsulated within a second coating or reducing agent consisting of erythorbic acid, ascorbic acid, hydroxylamine or mixtures thereof encapsulated within a second coating, wherein the second amount of the time-released agent is released at a second time;
wherein the treatment fluid contains about 0.01 pound per thousand gallons of the fluid to about 50 pounds per thousand gallons of the fluid of the first and second amounts of the time released form of the agent, and the agent forms a soluble product with iron.

14. A method for controlling iron in a well in a subterranean formation comprising:
providing a treatment fluid comprising water and a time-released form of a complexing agent consisting of formic acid, acetic acid, propionic acid, lactic acid, gluconic acid, glucoheptonic acid, or mixtures thereof encapsulated within a coating or of a reducing agent consisting of erythorbic acid, ascorbic acid, hydroxylamine or mixtures thereof encapsulated within a coating, wherein the time-released form of the agent is present in the treatment fluid in an amount of about 0.01 pound per thousand gallons of the fluid to about 50 pounds per thousand gallons of the fluid and the agent forms a soluble product with iron;
injecting the treatment fluid into the well of the formation until at least some of the treatment fluid contacts the formation and iron, wherein the iron includes iron originating from well equipment; and
maintaining the treatment fluid in contact with iron within the formation, thereby allowing the agent to release and interact with iron to form a soluble product.

15. The method of claim 14, wherein injecting the treatment fluid into the well is at a pressure greater than a fracture pressure of the formation.

16. The method of claim 14, wherein injecting the treatment fluid into the well is at a pressure less than a fracture pressure of the formation.

17. The method of claim 14, wherein the subterranean formation is a subterranean shale formation.

18. The method of claim 14, wherein the time-released form of the complexing agent or reducing agent is in a form that provides a varying release profile for the agent.

19. The method of claim 18, wherein the time-released form of the complexing agent or reducing agent comprises a first amount of time-released agent in a form to release at a first time and a second amount of time-released agent in a form to release at a second time.

20. The method of claim 14, wherein the iron includes iron originating from pipe erosion.

21. The method of claim 14, wherein the time-released form of a complexing agent or reducing agent is released 10 minutes after injection to 1 month after injecting.

22. The method of claim 14, wherein the treatment fluid comprises water and the time-released form of the complexing agent consisting of formic acid, acetic acid, propionic acid, lactic acid, gluconic acid, glucoheptonic acid, or mixtures thereof encapsulated within a coating.

23. The method of claim 14, wherein the treatment fluid comprises water and the time-released form of the reducing agent consisting of erythorbic acid, ascorbic acid, hydroxylamine, or mixtures thereof encapsulated within a coating.

\* \* \* \* \*